United States Patent [19]
Bowman et al.

[11] Patent Number: 5,746,942
[45] Date of Patent: May 5, 1998

[54] ERBIUM-DOPED LOW PHONON HOSTS AS SOURCES OF FLUORESCENT EMISSION

[75] Inventors: Steven R. Bowman, Davidsonville, Md.; Barry J. Feldman, Arlington, Va.; Leslie B. Shaw, Laurel, Md.

[73] Assignee: The United States of America as represented by the Secretary of the Navy, Washington, D.C.

[21] Appl. No.: 594,559

[22] Filed: Jan. 31, 1996

[51] Int. Cl.$^6$ .............................. H01S 3/16; H01S 3/17; H01S 3/094; C09K 11/77
[52] U.S. Cl. .................. 252/301.4 H; 252/301.4 R; 372/39; 372/40; 372/41; 372/4; 372/70; 372/75
[58] Field of Search .............. 252/301.4 R, 301.4 H; 501/40; 372/39, 43, 41, 70, 73, 4

[56] References Cited

U.S. PATENT DOCUMENTS

| | | | |
|---|---|---|---|
| 5,003,547 | 3/1991 | Esterowitz et al. | 372/41 |
| 5,022,040 | 6/1991 | Pollack et al. | 372/41 |
| 5,166,948 | 11/1992 | Gavrilovic et al. | 372/41 |
| 5,245,623 | 9/1993 | McFarlane | 372/75 |
| 5,541,012 | 7/1996 | Ohwaki et al. | 252/301.4 R |

*Primary Examiner*—Melissa Bonner
*Attorney, Agent, or Firm*—Thomas E. McDonnell; Barry A. Edelberg

[57] ABSTRACT

A high-efficiency fluorescent emitter includes an excitation source and a low phonon host doped with erbium. The emitter can be used as a lasing medium or as a phosphor. Typical hosts include $RcX_3$ and chalcogenide glasses, wherein Rc is yttrium, gadolinium, lutetium, lanthanum or a mixture thereof, and X is a halogen or a mixture of halogens.

14 Claims, 7 Drawing Sheets

ERBIUM-DOPED LOW PHONON HOSTS AS SOURCES OF FLUORESCENT EMISSION

BACKGROUND OF THE INVENTION

1. Field of the Invention

The present invention relates generally sources of fluorescent emission, and more specifically to fluorescent emission source useful as phosphors or lasers.

2. Description of the Background Art

An erbium-doped, fluorescence-based laser operating at 4.75 microns has been demonstrated in Er:YAlO$_3$. In hosts such as YAlO$_3$, multiphonon quenching of the 4I9/2 level results in lifetimes of this level on the order of a few microseconds or less. To sufficiently populate this level for gain to occur on the 4I9/2→4I11/2 transition of Er, a cascade scheme was employed whereby the 4I9/2 level was populated by stimulated emission of the 4S3/2 level on the 4S3/2→4I9/2 transition at 1.66 microns. Such a laser is characterized by short pulse operation of a few nanoseconds or less and low efficiency. Furthermore, optics suitable for laser emission at both 1.66 and 4.75 microns are necessary. Finally, a pump source near 500 nm capable of populating the 4S3/2 level is required. Currently, no efficient, reliable and compact pump source exists at this wavelength.

Lasers have also been demonstrated on the 4F9/2→4I9/2 transition in Er:LiYF4 at 3.4 microns and Er doped ZBLAN fibers at 3.5 microns. In Er:LiYF, multiphonon quenching of the 4F9/2 results in short room temperature lifetimes on the order of 60 microseconds. Furthermore, the energy gap of the 4F9/2→4S3/2 transition overlaps the energy gap of the 3F9/2→4S3/2 transition within 20 cm−1 and thus excited state absorption (ESA) occurs resulting in a decrease in slope efficiency and an increase in threshold. To reduce the effect of the multiphonon quenching and ESA, laser operation occurred on the 4F9/4→4I9/2 transition at LN$_2$ temperatures. Such operation is impracticable for many applications.

The Er doped ZBLAN fiber laser also showed the detrimental effects of multiphonon quenching. ZBLAN has a higher multiphonon energy than LiYF4 and thus multiphonon quenching is greater. Room temperature CW operation with up to 15 mW of output power was achieved with a 2.8% slope efficiency, however, high pump intensities of 80 kW/cm2 were necessary to achieve threshold for this laser. Construction of this laser in anything other than fiber form is handicapped by such large pump intensities for threshold.

Phosphors also rely upon fluorescence for their emission. Previously, it was not possible to efficiently obtain broadband fluorescent emission in the infrared range from phosphors. Thus, applications that required high intensity infrared emission, such as infrared spectroscopy, used heated wires as infrared emitters. The ability to use phosphors as broadband IR sources could potentially reduce the size, weight, and expense of devices incorporating IR sources.

SUMMARY OF THE INVENTION

Accordingly, it is an object of this invention to provide a highly efficient fluorescent emitter in the infrared range.

It is another object of the present invention to reduce multiphonon quenching in a fluorescent emitter in the infrared range.

It is a further object of the present invention to provide a highly efficient infrared laser.

It is yet another object of the present invention to provide a highly efficient infrared phosphor.

These and other objects are accomplished by an infrared fluorescent emitter including a low phonon energy host doped with erbium and a source of excitation light.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

In the present invention, the lasing medium or phosphor (hereinafter described as the fluorescent medium) is a low phonon energy host that has been doped with erbium. The dopant level of erbium should be sufficient to provide the required fluorescence. Typically, the dopant level of erbium may be from about 1 to 100 percent (roughly $10^{18}$ atoms/cm$^3$ to $10^{21}$ atoms/cm$^3$). A one-hundred percent erbium dopant level means that erbium atoms occupy all sites available to them in the host. Significantly, an ErCl$_3$ host having a one-hundred percent erbium dopant level is essentially pure ErCl$_3$, and is a useful fluorescent medium in the present invention.

Upon excitation, ground state erbium electrons in the host material are excited to either the 4F9/2 level or the 4I9/2 level, depending upon the mode of excitation. Erbium electrons excited to the 4F9/2 level fluoresce at 3.6 µm by a transition to the 4I9/2 level. Erbium electrons excited to the 4I9/2 level fluoresce at 4.5 µm by a transition to the 4I11/2 level. The width of these transitions is ±0.25 µm.

Any low phonon energy host may be used in the present invention. The use of a low phonon host allows 4F9/2 and 4I9/2 excited states of the erbium electrons in the low phonon hosts to have lifetimes of 0.05 ms or greater. Typical lifetimes for these excited states of erbium electrons in low phonon hosts extend from about 0.1 ms to about 10 ms, and more typically from about 0.15 ms to about 10 ms. The longer the lifetime of the excited electron, the better the energy storage in the fluorescent medium and the greater the efficiency of fluorescent emission.

Typically, the low energy phonon host of the present invention has a phonon energy of less than or equal to 350 cm$^{-1}$. Preferably, the phonon energy of the host is as low as possible. Most often, the phonon energy of the low phonon energy host is equal to or less than 300 cm$^{-1}$. Above 350 cm$^{-1}$, the lifetime of erbium electrons excited to the 4F9/2 or 4I9/2 state drops rapidly.

One typical low phonon energy host has the nominal formula RcX$_3$, where Rc is Er, Y, Gd, La, Lu, or a mixture thereof, and X is a halogen (typically Cl or Br) or a mixture of halogens. Typically, Rc is Er, Y, La or a mixture thereof. Chalcogenide glasses (for example selenium- or sulfur-based glasses such as BaInGaGeS and the glasses described and claimed in the commonly owned applications entitled MODIFIED GERMANIUM SULFIDE GLASS (U.S. Ser. No. 08/541,391, filed Oct. 10, 1995, now U.S. Pat. No. 5,699,248 ) and ALKALINE EARTH MODIFIED GERMANIUM SULFIDE GLASS (U.S. Ser. No. 08/396,292, filed Feb. 28, 1995) by Harbison et al., now U.S. Pat. No. 5,599,751) (both of which are incorporated herein by reference in their entirety)), also make excellent low phonon energy hosts for erbium. The ability of the present invention to use chalcogenide glasses as low phonon energy hosts for erbium permits the production of fluorescence-emitting fibers.

Figures 1A, 1B:
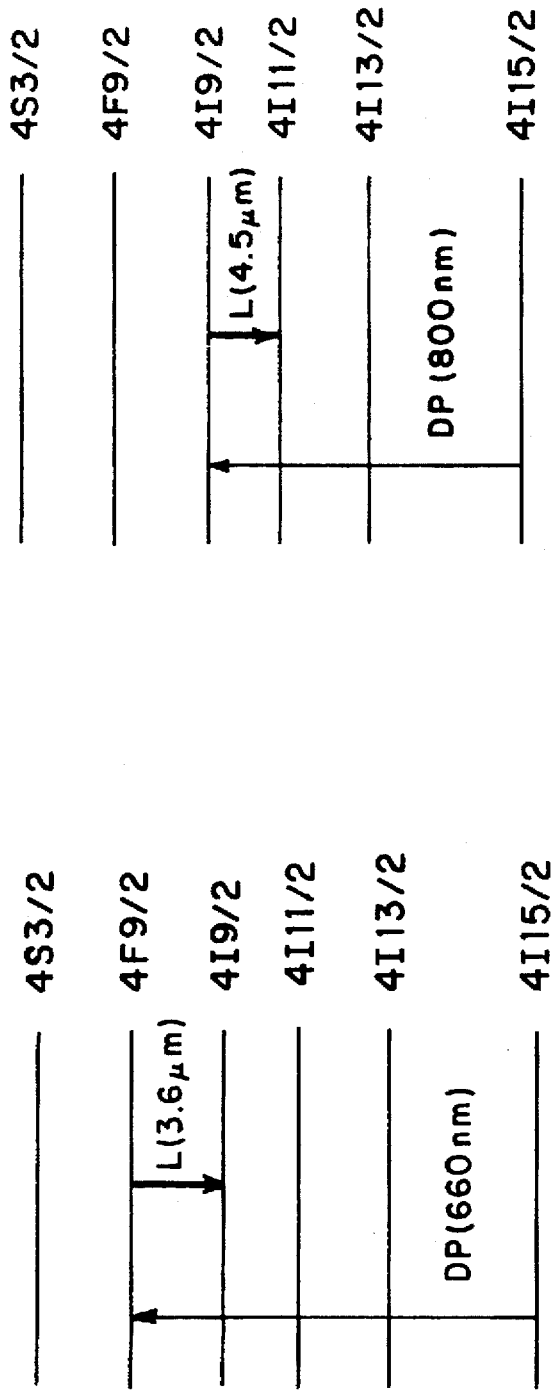
FIG. 1(*a*) and FIG. 1(*b*) are diagrams of pumping schemes for 3.6 micron and 4.5 micron operation, respectively.

Diagrams of the pumping schemes for 3.6 micron and 4.5 micron operation are shown in FIGS. 1(a) and 1(b), respectively. As we see in FIG. 1(a), the laser crystal is pumped by laser diodes near 0.66 microns. The Er ions of the host absorb the 0.66 micron and are excited to populate the 4F9/2 level as indicated by the arrow labeled DP. Stimulated emission occurs between 4F9/2 and 4I9/2 to generate laser emission at 3.6 microns. This is indicated by the arrow labeled L.

In FIG. 1(b) the laser crystal is pumped by laser diodes near 0.80 microns. The Er ions of the host absorb the 0.80 micron and are excited to populate the 4I9/2 level as indicated by the arrow labeled DP. Stimulated emission occurs between 4I9/2 and 4I11/2 to generate laser emission at 4.5 microns as indicated by arrow L.

Figure 2:
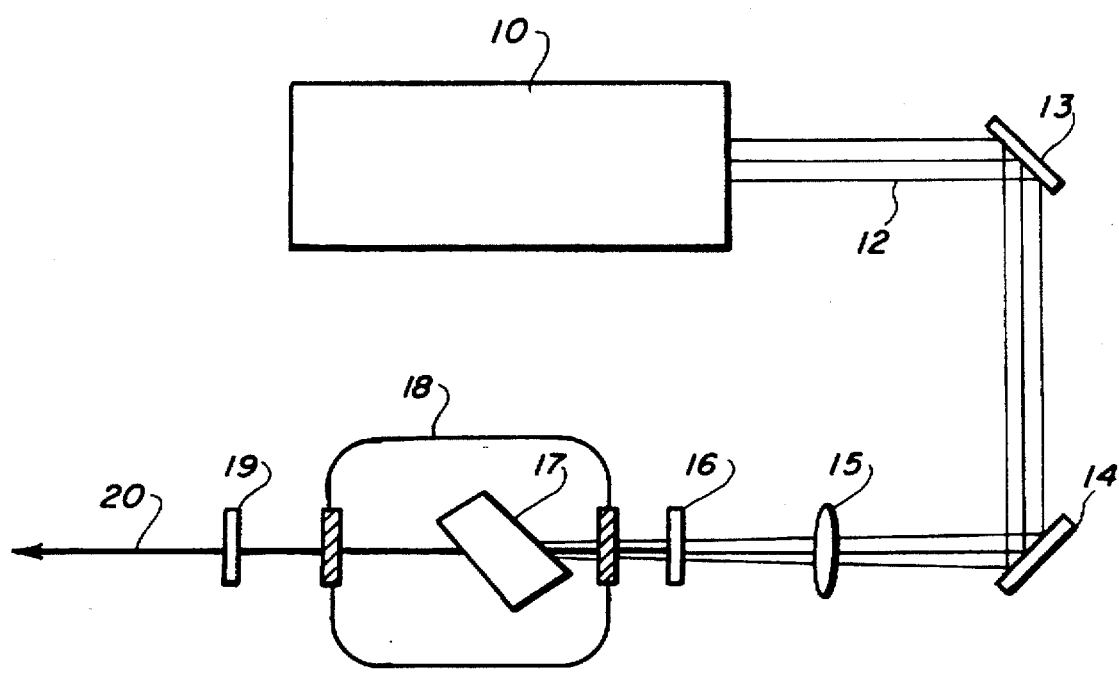
FIG. 2 schematically illustrates a laser in a accordance with a preferred embodiment of the present invention.

FIG. 2 schematically illustrates one embodiment of a laser according to the present invention. Pump source 10 directs pump beam 12 to first alignment mirror 13. First alignment mirror 13 then directs pump beam 12 to second alignment mirror 14. After being reflected by second alignment mirror 14, pump beam 12 is focused by lens 15 through rear IR mirror 16 onto lasing medium 17, which is housed within airtight lasing cavity 18. Fluorescence emitted by lasing medium 18 is amplified within lasing cavity 18 until its intensity is sufficiently great to form laser beam 20, traveling in the direction of the arrow, capable of passage through partially reflecting mirror 20.

Pumping can be achieved by laser diodes at 650–680 nm for the 4F9/2 level and at 780–830 nm for the 4I9/2 level. Diode pumping is also possible at these wavelengths. Flashlamp pumping into the higher absorption bands between 350–550 nm is also possible to populate the 4F9/2 and 4I9/2 levels for lasing. Upconversion pumping into the 4I13/2 between 1.5 µm (1.45–1.6 µm) is also possible.

Lasers according to the present invention are useful in CW and pulsed laser operation. The lasers may be operated using longitudinal, transverse, intracavity and ground state depletion pumping techniques with both coherent and incoherent pump sources. This invention is also operable with cascade lasing on both the 3.6 and 4.5 micron channels in Er whereby the Er is pumped at 660 nm and lased simultaneously on the 4F9/2→4I9/2 and 4I9/2→4I11/2 transitions.

Figure 3:
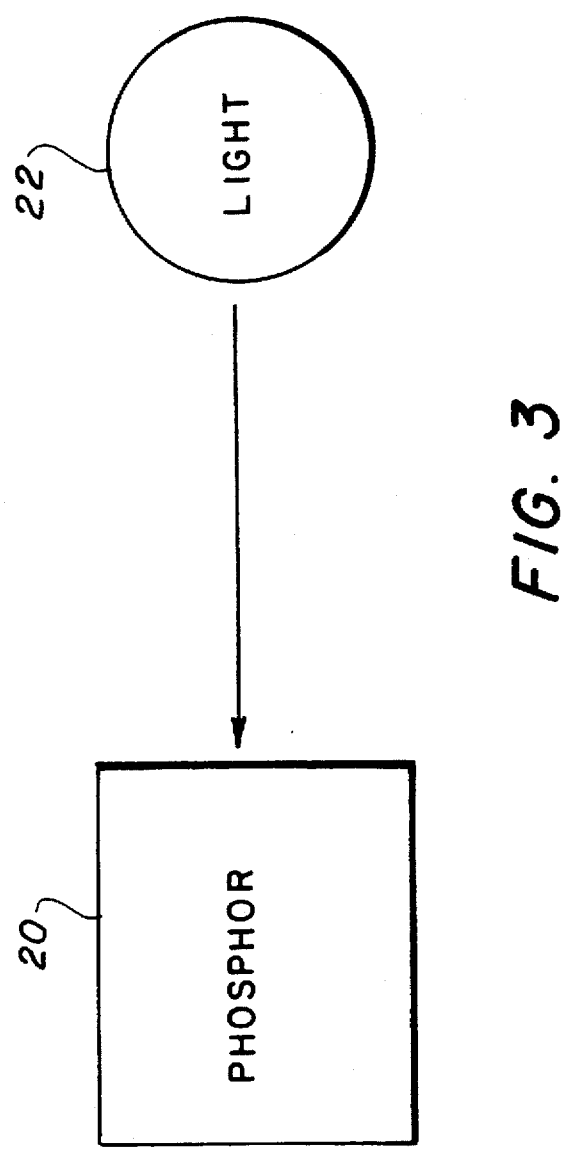
FIG. 3 schematically illustrates the operation of a phosphor according to the present invention.

As schematically shown in FIG. 3, the present invention is also useful as a high intensity phosphor. Here, a source of excitation light 20 is directed upon phosphor 22, resulting in the emission of infrared radiation from phosphor 22. Phosphors according to the present invention are useful, for example, as IR sources for infrared spectroscopy.

High intensity phosphors according to the present invention would operate in the 3–5 µm range. Pumping of the phosphors would be similar to the pumping schemes of the laser. Broadband emission from 3–5 µm would be produced on the 4F9/2→4I9/2 and 4I9/2→4I11/2 transitions. These Er phosphor materials have a higher brightness than practical black body sources. Other advantages of these materials over conventional thermal sources are that they are cool emitters; can be modulated fast; and have the ability to be fiber optically pumped.

Having described the invention, the following examples are given to illustrate specific applications of the invention including the best mode now known to perform the invention. These specific examples are not intended to limit the scope of the invention described in this application.

EXAMPLES

Growth of Lanthanide Halide Low Phonon Crystals

Commercial high purity anhydrous chlorides were reduced under a 10% HCl, 90% He atmosphere as the temperature was increased to the melting point of the anhydrous chlorides over a 6 hour period.

Typical melting temperatures were on the order of 700°–900° C. The reduced material was then vacuum sublimed and remelted into a quartz growth ampoule. The growth ampoule was constructed with the bottom end pointed to initiate crystallization for single crystal growth. Growth was achieved by a vertical Bridgman-Stockbarger method with a growth atmosphere of 10% HCl, 90% He. The growth rate was typically 2–3 mm/hour. The temperature of the upper zone of the furnace was typically +20° C. above the melting point of the chlorides and the temperature gradient of the furnace was 20°–30° C./cm.

Fluorescence Measurements

Figure 4:
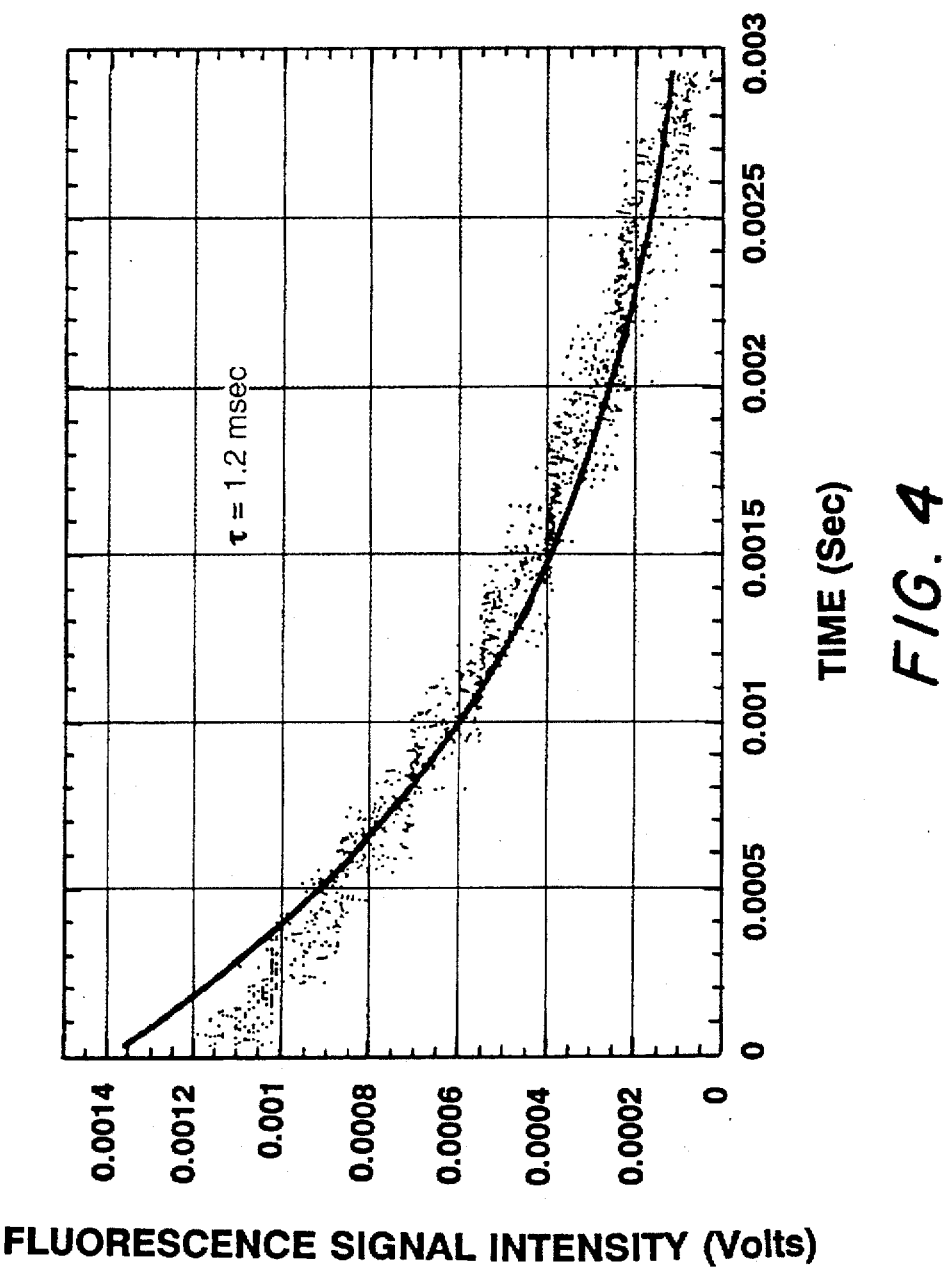
FIG. 4 shows the decay of the 4.5 micron fluorescence from the 4I9/2 level in ErCl$_3$.
Figure 5:
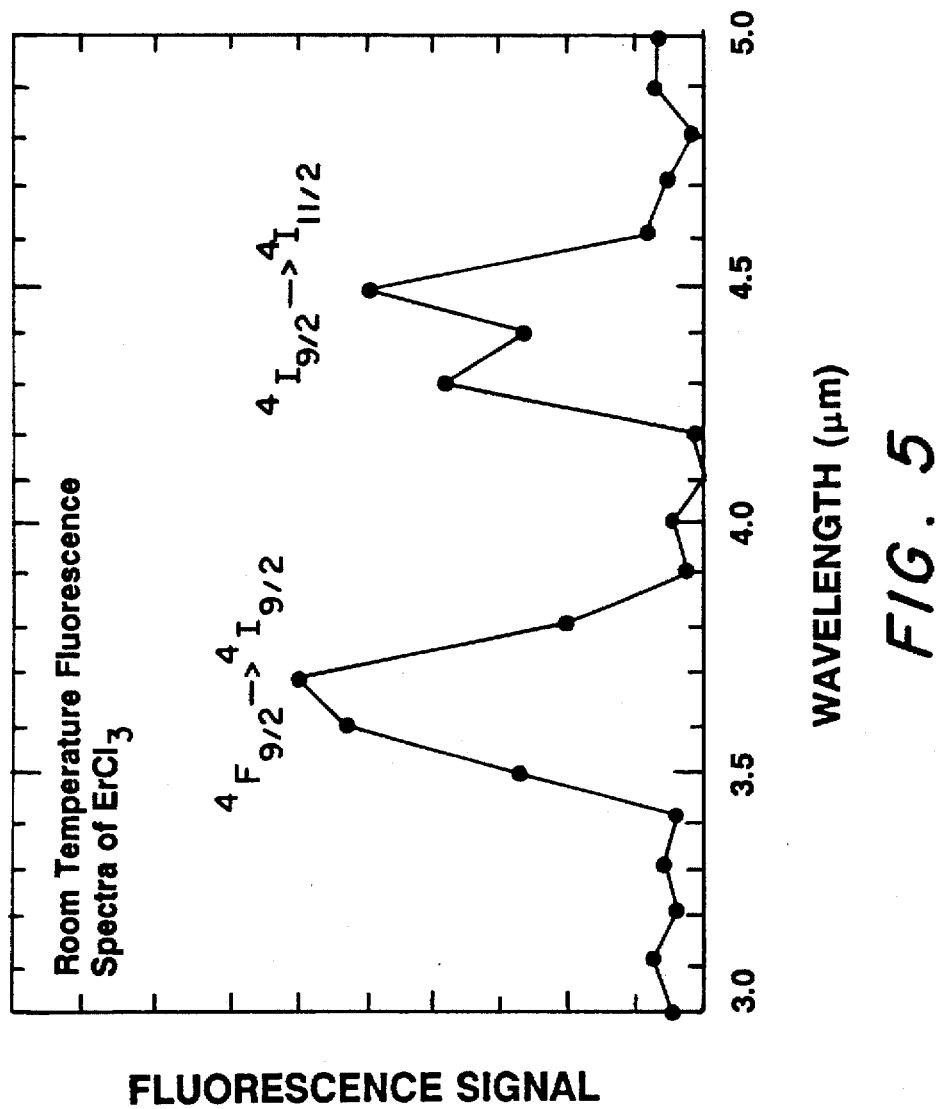
FIG. 5 is composite of the fluorescence spectra of ErCl$_3$ upon pumping at 660 nm and 800 nm in separate runs.
Figure 6:
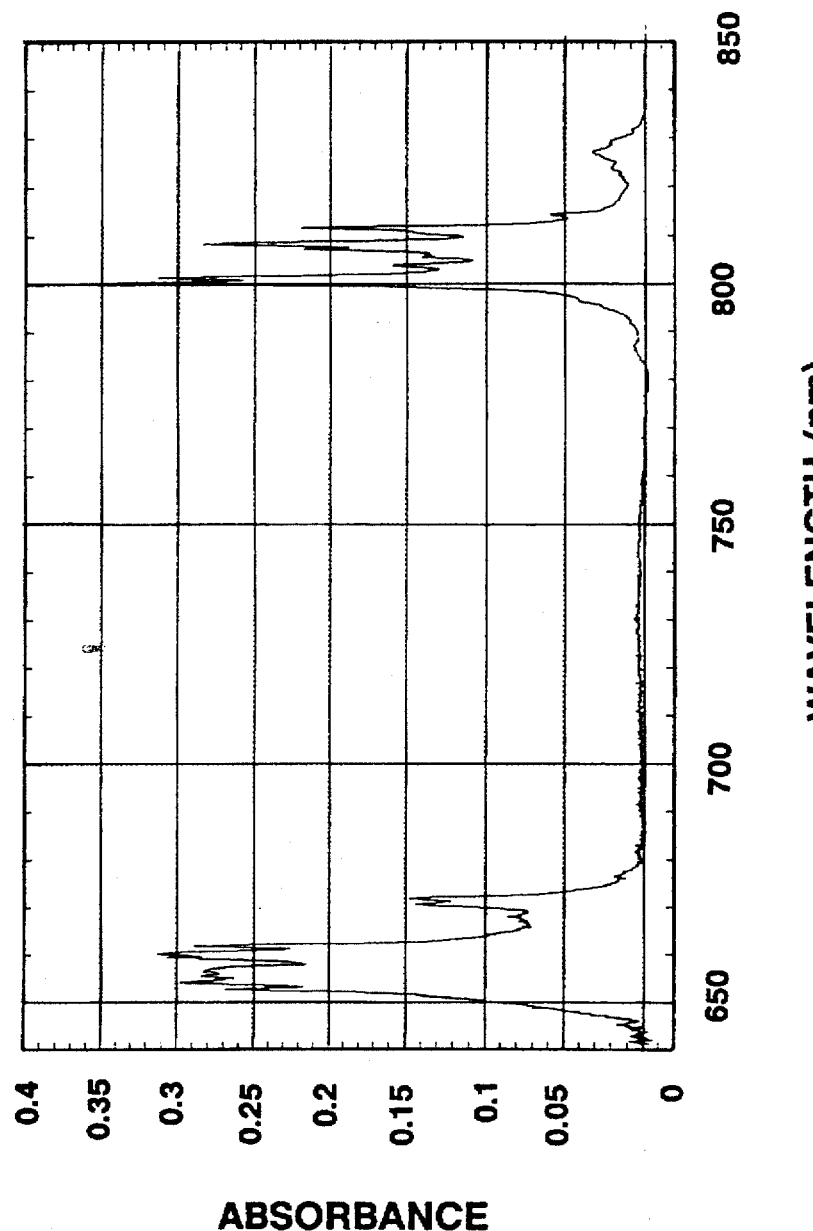
FIG. 6 shows the unpolarized absorption spectra of a 1.25 mm thick sample of ErCl$_3$.

Measurements on $ErCl_3$ as well as Er doped $LaCl_3$ and $GdCl_3$ indicate the feasibility of a 4.5 micron laser. FIG. 4 shows the decay of the 4.5 micron fluorescence from the 4I9/2 level in $ErCl_3$, as measured at 4.3 microns. A long lifetime of 1.2 msec is seen. Decays of Er doped $LaCl_3$ and $GdCl_3$ show similar lifetimes. Direct excitation of the 4I9/2 level at 800 nm results in strong fluorescence between 4.1 and 4.8 microns on the 4I9/2→4I11/2 transition. This strong fluorescence is exemplified by the fluorescence spectra of $ErCl_3$ shown in FIG. 5. Notably, the peak of this fluorescence occurs at 4.3 micron, however. Considerable fluorescence also exists at 4.4 and 4.5 micron. FIG. 5 also shows the fluorescence spectra of $ErCl_3$ resulting from direct pumping at 660 nm (the 4F9/2 to 4I9/2 transition). Direct excitation of the 4I9/2 level is possible as the absorption from the ground state is quite strong. As shown by the absorption spectra of FIG. 6, approximately 60% of the pump light is absorbed at 800 nm in a 1.25 mm sample of $ErCl_3$. These characteristics of long metastable state lifetime, strong fluorescence at the proposed lasing wavelength and good absorption of the pump light indicate the feasibility of a efficient 4.5 micron diode pumped Er laser.

Figure 7:
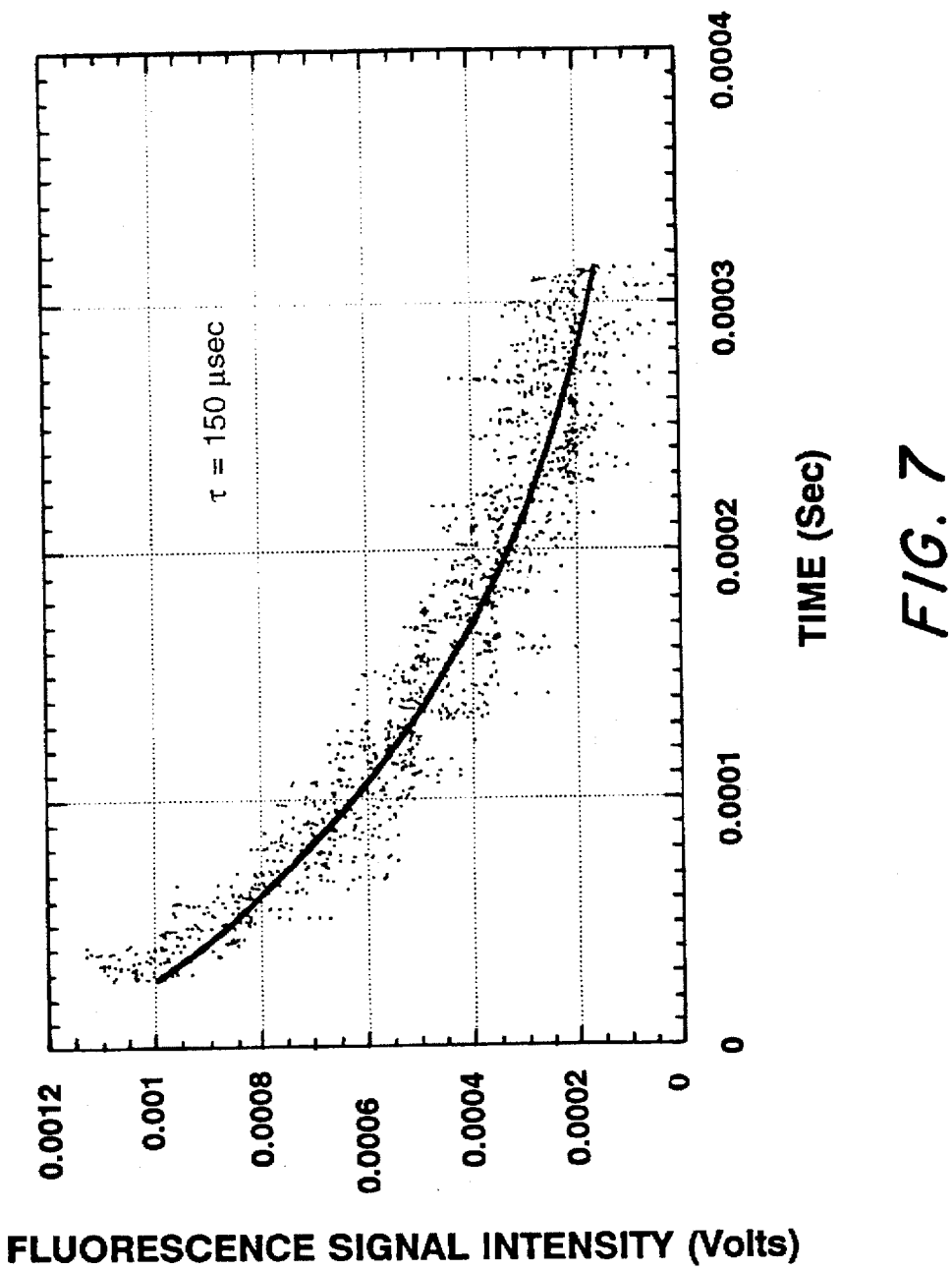
FIG. 7 graphically illustrates the decay of 3.6 µm fluorescence from 4F9/2 in ErCl$_3$.

Measurement of the fluorescence lifetime of the 4F9/2 level under upconversion pumping from the 4I9/2 level indicates a fluorescence lifetime of 150 microseconds in $ErCl_3$. A plot of this decay is shown in FIG. 7. While this lifetime is shorter than the lifetime of the 4F9/2 level, it is still over twice that seen in $Er:LiYF_4$ at room temperature. As we see from the fluorescence spectra of $ErCl_3$ in FIG. 5, a small fluorescence peak exists at 3.5–3.6 micron. The small intensity of this peak, however, is not surprising when compared to the 4.5 micron emission since the fluorescing level is weakly pumped by upconversion from 4I9/2. Under direct pumping at 660 nm, the fluorescence is expected to be much stronger. Again, direct pumping is not a problem. The absorption spectra of FIG. 6 indicates that nearly 50% of the 660 nm pump light would be absorbed in of a 1.25 mm sample of $ErCl_3$. This would populate the metastable state much greater than can be accomplished through upconversion pumping. Furthermore, since the energy gap overlap of the 4F9/2→4S3/2 and 3F9/2→4I9/2 transitions is not as good in $ErCl_3$ or $Er:LaCl_3$ as in Er:LIYF4, reduction of threshold and slope efficiency due to ESA should be drastically reduced. These factors of good pump absorption for directly pumping the 3F9/2 level, 150 microsecond lifetime of the metastable state and reduced ESA indicate the feasibility of an efficient 3.6 micron diode pumped Er laser.

Obviously, many modifications and variations of the present invention are possible in light of the above teachings. It is therefore to be understood that, within the scope of the appended claims, the invention may be practiced otherwise than as specifically described.

What is claimed is:

1. A fluorescent laser comprising a source of excitation light, a lasing medium including a host having a phonon energy of no greater than about 350 $cm^{-1}$ and doped with erbium at a dopant level of about 1% to 100%, and a lasing cavity housing said lasing medium therein, said laser cavity amplifying fluorescent emissions having a wavelength of about 3 μm to about 5 μm from said lasing medium and outputting said amplified emissions.

2. The fluorescent laser of claim 1, wherein said source of excitation light emits electromagnetic radiation at a wavelength of about 650 nm to about 680 nm.

3. The fluorescent laser of claim 2, wherein said source of excitation light emits electromagnetic radiation at a wavelength of about 660 nm.

4. The fluorescent laser of claim 1, wherein said source of excitation light emits electromagnetic radiation at a wavelength of about 780 nm to about 830 nm.

5. The fluorescent laser of claim 4, wherein said source of excitation light emits electromagnetic radiation at a wavelength of about 800 nm.

6. The fluorescent laser of claim 1, wherein said host has a phonon energy equal to or less than 300 $cm^{-1}$.

7. The fluorescent laser of claim 1, wherein electrons of said erbium in said host, when excited to a $^4F_{9/2}$ level or to a $^4I_{9/2}$ level, have a lifetime of at least about 0.05 ms.

8. The fluorescent laser of claim 1, wherein electrons of said erbium in said host, when excited to a $^4F_{9/2}$ level or to a $^4I_{9/2}$ level, have a lifetime of at least about 0.1 ms.

9. The fluorescent laser of claim 1, wherein said source of excitation light is a laser diode.

10. The fluorescent laser of claim 1, wherein said host is selected from the group consisting of $RcX_3$ and chalcogenide glasses, wherein:

Rc is yttrium, gadolinium, lutetium, lanthanum or a mixture thereof; and

X is a halogen or a mixture of halogens.

11. The fluorescent laser of claim 10, wherein X is chlorine, bromine, or a mixture thereof.

12. A method of emitting an infrared laser beam, comprising the steps of:

housing, within a lasing cavity, a medium including a host having a phonon energy of no greater than about 350 $cm^{-1}$ and doped with erbium at a dopant level of about 1% to 100% ; and exciting, within said lasing cavity, ground state electrons of erbium in said medium to a $^4F_{9/2}$ level or a $^4I_{9/2}$ level; and lasing said excited ground state electrons on a $^4F_{9/2}$→$^4I_{9/2}$ or a $^4I_{9/2}$→$^4I_{11/2}$ transition, respectively.

13. The method of claim 12, wherein said exciting step is performed by exposing said medium to electromagnetic radiation at a wavelength of about 650 nm to about 680 nm.

14. The method of claim 12, wherein said exciting step is performed by exposing said medium to electromagnetic radiation at a wavelength of about 780 nm to about 830 nm.

* * * * *